United States Patent
Parisot

(10) Patent No.: US 12,184,986 B2
(45) Date of Patent: Dec. 31, 2024

(54) AMPLIFIER GLOW REDUCTION

(71) Applicant: Luxembourg Institute of Science and Technology (LIST), Esch/Alzette (LU)

(72) Inventor: Olivier Parisot, Esch/Alzette (LU)

(73) Assignee: LUXEMBBOURG INSTITUTE OF SCIENCE AND TECHNOLOGY (LIST), Esch/Alzette (LU)

( * ) Notice: Subject to any disclaimer, the term of this patent is extended or adjusted under 35 U.S.C. 154(b) by 183 days.

(21) Appl. No.: 18/147,839

(22) Filed: Dec. 29, 2022

(65) Prior Publication Data

US 2023/0217115 A1    Jul. 6, 2023

(30) Foreign Application Priority Data

Dec. 30, 2021 (LU) .................... LU501135

(51) Int. Cl.
*H04N 23/73* (2023.01)
*G06T 7/11* (2017.01)

(52) U.S. Cl.
CPC ............. *H04N 23/73* (2023.01); *G06T 7/11* (2017.01); *G06T 2207/10144* (2013.01); *G06T 2207/20081* (2013.01)

(58) Field of Classification Search
CPC . H04N 23/73; G06T 7/11; G06T 2207/10144; G06T 2207/20081; G06T 5/60; G06T 5/70; G06T 2207/10004; G06T 2207/20021; G06T 2207/20084

See application file for complete search history.

(56) References Cited

U.S. PATENT DOCUMENTS

| | | | |
|---|---|---|---|
| 8,022,452 B2* | 9/2011 | Wang | H01L 31/02164 257/446 |
| 8,391,633 B2* | 3/2013 | Watanabe | G06T 5/40 382/274 |
| 2020/0175727 A1* | 6/2020 | Phogat | G06T 7/90 |

OTHER PUBLICATIONS

Luxembourg Search Report corresponding to application No. LU 501135, dated Jul. 26, 2022, 1 page.
Elhakiem, et al., "Astronomical Image Denoising Based on Convolutional Neural Network", 2021 Tenth International Conference on Intelligent Computing and Information Systems (ICICIS), IEEE, Dec. 5, 2021, pp. 51-56, 6 pages.
Schawinski, et al., "Generative Adversarial Networks Recover Features in Astrophysical Images of Galaxies Beyond the Deconvolution Limit", Arxiv.Org, Cornell University Library, Feb. 21, 2017, 6 pages.
Vojtekova, et al., Learning to Denoise Astronomical Images with U-nets, Arxiv.Org, Cornell University Library, Nov. 13, 2020, 12 pages.

* cited by examiner

*Primary Examiner* — Abdelaaziz Tissire
(74) *Attorney, Agent, or Firm* — RANKIN, HILL & CLARK LLP

(57) ABSTRACT

An efficient tool to remove amplifier glow from low-light and long-exposure digital images, without sacrificing the useful signal contained in these images. This is particularly useful in deep space imagery, where long exposure times are common, and wherein the darkness of the capture images further highlights the effects of amplifier glow.

12 Claims, 2 Drawing Sheets

AMPLIFIER GLOW REDUCTION

TECHNICAL FIELD

The invention lies in the field of image processing. In particular it relates to the processing of digital images that have been captured using prolonged exposure times, and that are affected by amplifier glow.

BACKGROUND OF THE INVENTION

The term "amplifier glow" has been coined when digital images were capture using charge-coupled device, CCD, sensors. Nowadays, the term generally refers to any kind of "glow" in a digital image that is caused by the camera sensor itself. Glows are areas of the image that become brighter than neighbouring areas due to circuitry within the camera or sensor. Historically it was usually caused by aging amplifier circuit in CCD cameras, often appearing in an area of the frame near to the amplifier. With a CCD camera, most readout electronics are off the sensor, located on the circuit board around the sensor.

In complementary metal-oxide semiconductor cameras, amplifier glow is usually not generated by an amplifier. CMOS sensors are usually fully integrated, which means that, unlike a CCD, readout electronics are included on the sensor die along with all the pixels themselves. Support circuits on the sensor die itself can generate heat or may even emit near-infrared, NIR, light, both of which can cause glows on the sensor. Additionally, many modern CMOS sensors include high performance image processing as part of the sensor package, either in the form of on-die processing or a secondary processor that is directly integrated into the sensor. This processing circuitry can often generate heat that may produce glows.

Heat can increase the dark current accumulated in pixels. Pixels that exhibit roundish glows, usually soft without any obvious structure, are caused by heat sources. Not all pixels in a sensor will be affected, nor will those affected be affected uniformly. Glows may not "grow" with time the same way dark current itself does, and may accelerate over time becoming brighter faster than dark current itself as exposures become longer.

Amplifier glow becomes more prominent in long exposure pictures, such as for example deep space imagery, where exposure times of several minutes or tens of minutes are often used to capture the scarcely available light. The undesirable amplifier glow is merged with the real signal.

Known approaches to handle amplifier glow includes capturing dark masks that are subtracted from affected images, human manipulations in image processing software to manually remove the glow, for example by cropping images. Aggressive noise removal techniques have been proposed, but all the known methods act on the useful signal of the images as well as on the unwanted amplifier glow.

Technical Problem to be Solved

It is an objective of the invention to present a data processing method which overcomes at least some of the disadvantages of the prior art, in particular, it is a goal to remove amplifier glow from low-light and long-exposure digital images, without sacrificing the useful signal contained in these images.

SUMMARY OF THE INVENTION

In accordance with a first aspect of the invention, a method for removing amplifier glow in a digital image is provided. The method comprises the steps of:

i) providing a machine learning algorithm that is trained for detecting representations of amplifier glow in a digital image;
ii) detecting at least one representation of amplifier glow in a digital image using said trained machine learning algorithm and determining an image patch of said digital image, the determined image patch comprising said representation;
iii) generating a corrected patch from said determine patch using a trained Generative Adversarial Network algorithm, wherein the corrected patch does not comprise an amplifier glow representation;
iv) using data processing means, replacing said determined patch with said corrected patch, to generate a corrected digital image.

Preferably, the machine learning algorithm may comprise a deep learning algorithm.

step i), the provision of a machine learning algorithm may preferably comprise the allowing training, steps;
  providing a plurality of amplifier glow-free digital images in a digital image store;
  providing at least one image mask comprising a least one amplifier glow representation in a memory element;
  generating, using data processing means, a set of training images by randomly adding transformations of said at least one image mask to images in said digital image store, and storing the resulting images in a training image store;
  using data processing means, training said machine learning algorithm for detecting amplifier glow using said set of training images.

Preferably, the detection step ii) may comprise a preliminary step of segmenting the digital image into a central tile and a plurality of border tiles, and wherein the trained machine learning algorithm operates only on said border tiles. The determined image patch used as input to the Generative Adversarial Network comprises at least a portion of a border tile in which amplifier glow was detected, and preferably also comprises information from the central tile or neighbouring border tiles. The tiles may preferably only restrict the input to the Generative Adversarial Network. The entire original image data may preferably be used to determine said image patch.

Preferably, step iii) may be repeated using a larger image patch which includes said determined image patch comprising the detected amplifier glow representation, if said corrected patch comprises changed image data within a predetermined border area. The border area may comprise a predetermined number of pixels as counted from each border of the digital image.

The digital image may preferably be a raw and unfiltered digital image.

Preferably, the Generative Adversarial Network may be configured to generate an amplifier glow-free output image patch based on an input image patch comprising amplifier glow.

The digital image may preferably be acquired using an exposure time of more than 60 seconds. Preferably, the exposure time may be longer than 5 minutes, or longer than 10 minutes.

Preferably, the digital image may be a deep space image.

According to another aspect of the invention, a computer system comprising data processing means and a memory element is provided. The data processing means are configured for carrying out the method according to aspects of the invention.

In accordance with a further aspect of the invention, a computer program comprising computer readable code means is provided, which, when run on a computer system, causes the computer system to carry out the method according to aspects of the invention.

According to a final aspect of the invention, a computer program product is provided, comprising a computer readable medium on which the computer program according aspects of the invention is stored.

Aspects of the invention provide an efficient tool to remove amplifier glow from low-light and long-exposure digital images, without sacrificing the useful signal contained in these images. This is particularly useful in deep space imagery, where long exposure times are common, and wherein the darkness of the capture images further highlights the effects of amplifier glow. By using machine learning techniques, it becomes possible to process amplifier glow as an artefact that is distinct from the useful signal in the image data. The proposed method avoids to act aggressively on the useful signal, by efficiently detecting and removing representations of amplifier glow. The entire processing is repeatable while the amount of processed data is kept small. As amplifier glow is mainly present in the border areas of digital images, embodiments of the invention only process these regions to ease the processing load and to use less energy. By doing so, a majority of the useful signal remains unprocessed.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes features of the invention in further detail based on preferred embodiments and on the figures, without limiting the invention to the described embodiments. Unless otherwise stated, features described in the context of a specific embodiment may be combined with additional features of other described embodiments.

The description puts focus on those aspects that are relevant for understanding the invention, it will for example be clear to the skilled person that a device implementing the method in accordance with the invention comprises other commonly known aspects, such as for example an appropriately dimensioned power supply or battery, or a data communication bus linking a memory to a processor, even if those aspects are not explicitly mentioned.

Main aspects of the invention are driven by the observations that amplifier glow is mainly located in the corners and/or borders of a digital image. Amplifier glow is rarely, if ever, observed in the center of a digital image. If it affects deep space digital images, amplifier glow may be merged with captured representations of stars or nebulae. In general, amplifier glow should not be considered as image noise, but rather as artefacts that are independent from the useful captured signal in the image, and the artefacts should be independently removed to save the useful signal.

Figure 1:
FIG. 1 is a workflow showing main steps of a preferred embodiment of the method in accordance with the invention.
Figure 2:
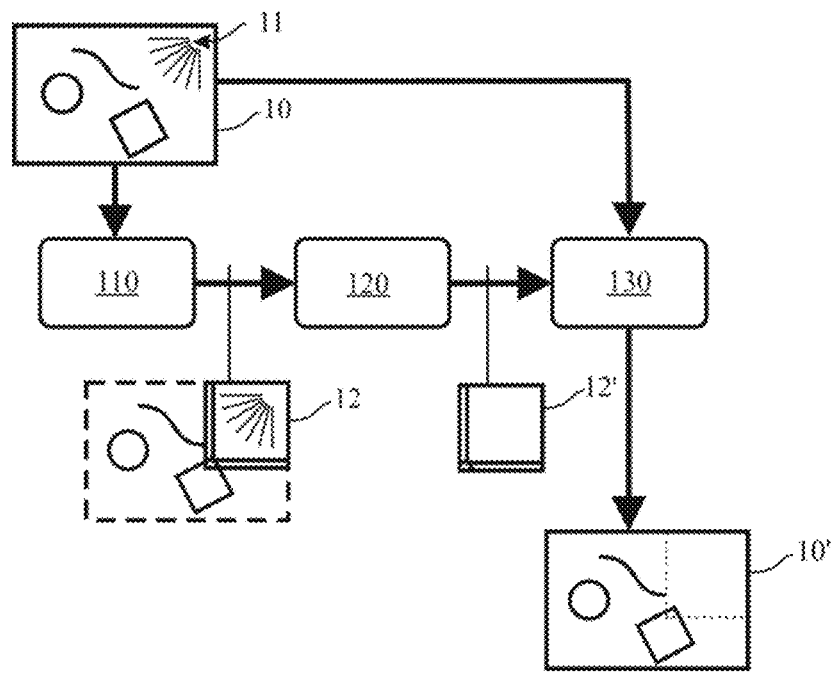
FIG. 2 illustrates the main steps of an image processing workflow in accordance with a preferred embodiment of the invention.

FIG. 1 shows a workflow of the main steps according to a preferred embodiment of the invention, while FIG. 2 further illustrates the actions performed at each step. The proposed method aims at removing amplifier glow 11 in a digital image 10. At a first step i), a machine learning algorithm 110 that has been trained for detecting representations of amplifier glow 11 in a digital image 10 is provided. The trained machine learning algorithm or model may comprise a deep learning algorithm. It is stored in a memory element such as a solid-state drive, SDD, or a hard disk drive, HDD. Preferably the memory element is a persistent memory element.

The trained machine learning algorithm 110 is used to detect at least one representation of amplifier glow 11 in a digital image. The digital image is preferably stored in a memory element, and it has been acquired using a prolonged exposure time, which has led to the appearance of amplifier glow. The output of the trained machine learning algorithm 110 provide an identification of the amplifier glow. Using image processing means, which may be implemented using an application specific integrated circuit or a general-purpose data processor, such as a programmed central processing unit, CPU, an image patch 12 which comprises the detected amplifier glow representation 11 is determined within the original digital image 110. This corresponds to step ii).

The determined patch 12 comprising the detected amplifier glow is fed as input to a trained Generative Adversarial Network, GAN, algorithm 120, which if configured to generate a corrected patch 12', which is devoid of the previously present amplifier glow. As the GAN only operates on image data which has been identified in step ii) as containing amplifier glow, the implementation can be kept lightweight, and image data that is unaffected by amplifier glow is left unprocessed, which decreases the risk of losing useful signal information. This corresponds to step iii).

At step iv), the patch 12 of the original digital image 10 that was identified as containing amplifier glow is replaced using the image processing means by the corrected patch 12'. As a result, a corrected digital image 10' is produced, which is devoid of amplifier glow, but which maintains with high likelihood the originally present useful signal of the image. The corrected image 10' is preferably stored in a memory element.

According to a preferred embedment of the invention, at step iv), a preliminary check is performed by the image processing means. The difference between a border region, having for example a width of 5 to 10 pixels, of the original patch 12 and the corrected patch 12' is computed. If the difference is not null, the GAN has changed image data within the border region. As the border region marks the area in which the corrected patch is stitched back into the original image, changed data in this area is likely to affect the visual aspect of the image: it may become apparent to the human eye that a patch was applied. Therefore, if the computed difference is larger than a pre-determined threshold (which may be expressed in a number of differing pixels), a new patch is determined, which is larger than the original patch 12 but which comprises the latter in its entirety. Then this new determine patch is fed as input into the GAN, which produces a new corrected patch. The new corrected patch is set to replace the original patch m the original digital imago 10. This checking step may be iterated until the border area of the corrected patch satisfies the predetermined threshold.

Figure 3:
FIG. 3 shows a mask comprising amplifier glow.

FIG. 3 provides an example of a mask that is useful in training the machine learning algorithm 110. Amplifier glow is apparent in the lower corners as well as in the upper right corner of the mask. Amplifier glow masks are generated by using a set of existing amplifier glow representations, which may for example be extracted manually from existing images, and then randomly transformed by using Data Augmentation techniques as explained by Shorten, C., & Khoshgoftaar, T. M. (2019). "A survey on image data augmentation for deep learning." Journal of Big Data, 6(1), 1-48.

Figure 4:
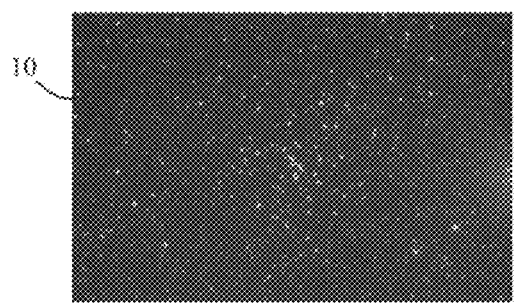
FIG. 4 shows a digital image comprising amplifier glow.

By way of a non-limiting example, the machine learning algorithm 110 may be trained as follows. First a plurality of amplifier glow-free digital images is provided in a digital image store, which may for example be a structured database to which the data processing means have at least read access. At least one image mask comprising at least one amplifier glow representation, as shown by way of example in FIG. 4, is provided in a memory element. A set of training images is then generated by randomly adding transformations (geometric transformation, scaling, rotations, skewing, etc . . . ) of said at least one image mask to the images stored in said digital image store, and the resulting images are stored in a training image store. The data contained in the training image store is used to train the machine learning algorithm so that it becomes able to detect amplifier glow. The training set contains couples of images: the images with amplifier glow (input) and the same image without amp glow (expected output). The labelling of the training data is therefore implicit.

The General Adversarial Network, GAN, model is designed to remove the amplifier glow from input images. A GAN model is composed of two Deep Learning models: a generator that ingests an image and provides another image as output, and a discriminator which guides the generator during the training by detecting real/fake images. The Python implementation that has been used to implement the invention is based on the Pix2Pix approach (Isola, P., Zhu, J. Y., Zhou, T., & Efros, A. A. (2017). "Image-to-image translation with conditional adversarial networks". In Proceedings of the IEEE conference on computer vision and pattern recognition (pp. 1125-1134).). Pix2Pix is generally used to transform an image into another form (ex: https:// phillipi.github.io/pix2pix/), but here it has been used it to remove something from the image. The resolution of input/output images may for example of 512×512 pixels, which proved sufficient to remove the amplifier glow. Lower resolution may be considered without leaving the scope of the present invention, as they lead to a more lightweight GAN (i.e., a lighter generator and a lighter discriminator).

Figure 5:
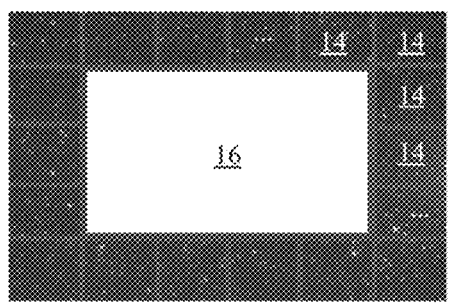
FIG. 5 shows a tiling of the digital image shown in FIG. 4, in accordance with a preferred embodiment of the invention.
Figure 6:
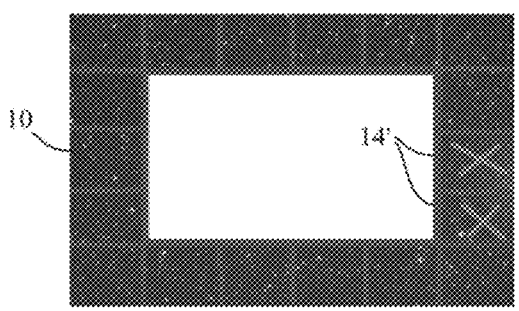
FIG. 6 shows the detection of tiles comprising amplifier glow, in accordance with a preferred embodiment of the invention.
Figure 7:
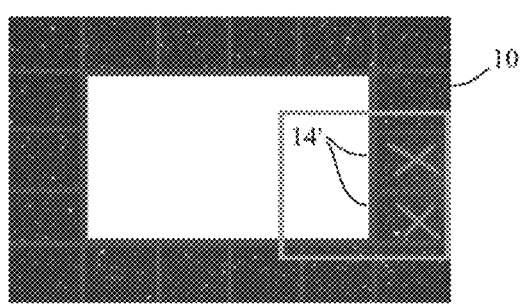
FIG. 7 shows the determination of an image patch comprising detected amplifier glow, in accordance with a preferred embodiment of the invention.
Figure 8:
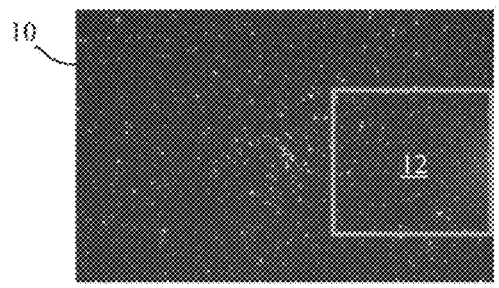
FIG. 8 shows the digital image, and the identified input to the Generative Adversarial Network, in accordance with a preferred embodiment if the invention.
Figure 9:
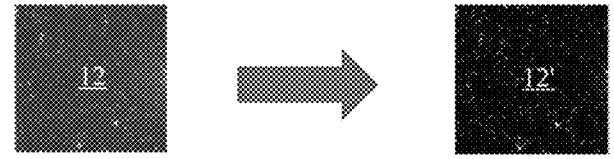
FIG. 9 shows the transformation of the input shown in FIG. 8, into a corrected image patch, as provided by the Generative Adversarial Network in accordance with a preferred embodiment of the invention.

Another preferred embodiment of the invention is described based on the illustrations provided in FIGS. 4 to 10. FIG. 4 shows a deep space digital image 10 that shows amplifier glow. The image may for example have been captured through a telescope and using a CMOS sensor. The image is raw in the sense that no de-noising filter, which could have an effect on both the useful signal and the amplifier glow, has been applied, in this preferred embodiment, the image is divided into tiles 14 covering the border region, as shown in FIG. 5. The tiles 14 may all be of the same dimensions, or they may be of different dimension. One tile may for example cover the entire top border. The center of the image 16 is disregarded as amplifier glow is rarely present in the corresponding area. Only the tiles 14 are used as input to the trained machine learning algorithm. In FIG. 6, the output of the machine learning algorithm is shown. Two tiles 14' have been identified as containing a representation of amplifier glow. As shown in FIG. 7, a patch area comprising the identified tiles 14' is computed using data processing means. FIG. 8 shows the corresponding area in the original image 10. The patch 12 that comprises the two tiles 14' as well as original data from the central region of the image is used as input to the Generative Adversarial Network. As shown in FIG. 9, the GAN operates exclusively on the path 12 in order to produce the corrected patch 12', which is devoid of the previously present amplifier glow.

Figure 10:
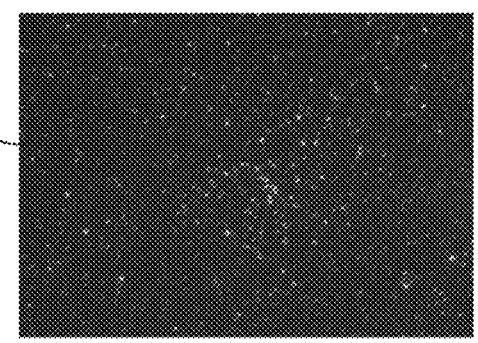
FIG. 10 shows a corrected version of the digital image shown in FIG. 4, as provided by a preferred embodiment of the invention.

FIG. 10 finally shows the corrected image 10', in which the original patch 12 has been removed, and replaced with the corrected path 12'. Through the use of preliminary tiling of the image into regions of interest, then through identifying tiles that indeed contain amplifier glow, and then finally by correcting only image patches containing these tiles using a GAN, the proposed method becomes computationally efficient, and refrains from processing useful image content that is unaffected by amplifier glow.

Using the provided description and figures, a person with ordinary skills in computer programming will be able to implement the described methods in various embodiments without undue burden and without exercising inventive skill.

It should be understood that the detailed description of specific preferred embodiments is given by way of illustration only, since various changes and modifications within the scope of the invention will be apparent to the skilled person. The scope of protection is defined by the following set of claims.

The invention claimed is:

1. A computer-implemented method for removing an amplifier glow feature in a digital image, comprising:
    electronically acquiring a digital image using a prolonged exposure time;
    detecting at least one representation of an amplifier glow feature in the digital image using a trained machine learning dataset and determining an image patch of said digital image, the determined image patch comprising said representation of the amplifier glow feature;
    generating a corrected image patch from said determined image patch using a trained Generative Adversarial Network, wherein the corrected image patch does not include the at least one representation of the amplifier glow feature; and
    replacing said determined image patch with said corrected image patch to generate, a corrected digital image.

2. The computer-implemented method according to claim 1, wherein a deep learning model is executed to detect the at least one representation of the amplifier glow feature.

3. The computer-implemented method according to claim 1, further including:

providing a plurality of amplifier glow-free digital images in a digital image store;

providing at least one image mask comprising the at least one representation of the amplifier glow feature in a memory element;

generating a set of training images by randomly adding transformations of said at least one image mask to images in said digital image store, and storing the training images in a training image store;

training said machine learning dataset for detecting the amplifier glow feature using said set of training images.

4. The computer-implemented method according to claim 1, wherein detecting at least one representation of the amplifier glow feature in the digital image comprises a preliminary step of segmenting the digital image into a central tile and a plurality of border tiles, and wherein machine learning operates on said border tiles.

5. The computer-implemented method according to claim 1, wherein the step of generating a corrected image patch is repeated using a larger image patch which includes said determined image patch comprising the at least one representation of the amplifier glow feature, if said corrected image patch comprises changed image data within a predetermined border area.

6. The computer-implemented method according to claim 1, wherein said digital image is a raw and unfiltered digital image.

7. The computer-implemented method according to claim 1, wherein the Generative Adversarial Network is configured to generate an amplifier glow feature free output image patch based on an input image patch comprising the amplifier glow feature.

8. The computer-implemented method according to claim 1, wherein the prolonged exposure time is at least 60 seconds.

9. The computer-implemented method according to claim 1, wherein said digital image is a deep space image.

10. A computer system comprising data processing means and a memory element, wherein the data processing means are configured to execute instructions that cause the data processing means to:

electronically acquire a digital image using a prolonged exposure time;

detect at least one representation of an amplifier glow feature in the digital image using a trained machine learning dataset and determine an image patch of said digital image, the determined image patch comprising said representation of the amplifier glow feature;

generate a corrected image patch from said determined image patch using a trained Generative Adversarial Network, wherein the corrected image patch does not include the at least one representation of the amplifier glow feature; and replace said determined image patch with said corrected image patch to generate a corrected digital image.

11. A non-transitory computer readable storage medium storing instructions that when executed by a computer, which includes a data processing means performs a method, the method comprising:

electronically acquiring a digital image using a prolonged exposure time;

detecting at least one representation of an amplifier glow feature in the digital image using a trained machine learning dataset and determining an image patch of said digital image, the determined image patch comprising said representation of the amplifier glow feature;

generating a corrected image patch from said determined image patch using a trained Generative Adversarial Network, wherein the corrected image patch does not include the at least one representation of the amplifier glow feature; and replacing said determined image patch with said corrected image patch to generate a corrected digital image.

12. The non-transitory computer readable storage medium of claim 11, further including:

providing a plurality of amplifier glow-free digital images in a digital image store;

providing at least one image mask comprising the at least one representation of the amplifier glow feature in a memory element;

generating a set of training images by randomly adding transformations of said at least one image mask to images in said digital image store, and storing the training images in a training image store; and training said machine learning dataset for detecting the amplifier glow feature using said set of training images.

* * * * *